(12) United States Patent
Kikuchi et al.

(10) Patent No.: US 10,883,676 B2
(45) Date of Patent: Jan. 5, 2021

(54) OPTICAL BODY HAVING A CONCAVE-CONVEX STRUCTURE, METHOD FOR MANUFACTURING THE OPTICAL BODY, AND LIGHT EMITTING DEVICE

(71) Applicant: DEXERIALS CORPORATION, Tokyo (JP)

(72) Inventors: Masanao Kikuchi, Tokyo (JP); Shunichi Kajiya, Tokyo (JP); Asahiko Nogami, Tokyo (JP); Kyoko Sakurai, Tokyo (JP); Kazuya Hayashibe, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/335,126

(22) PCT Filed: Sep. 27, 2017

(86) PCT No.: PCT/JP2017/035028
§ 371 (c)(1),
(2) Date: Mar. 20, 2019

(87) PCT Pub. No.: WO2018/062309
PCT Pub. Date: Apr. 5, 2018

(65) Prior Publication Data
US 2019/0211978 A1    Jul. 11, 2019

(30) Foreign Application Priority Data
Sep. 29, 2016    (JP) .................................. 2016-191709

(51) Int. Cl.
*G02B 6/00*     (2006.01)
*G02B 1/118*    (2015.01)
(Continued)

(52) U.S. Cl.
CPC ................ *F21S 2/00* (2013.01); *G02B 1/118* (2013.01); *G02B 5/00* (2013.01); *G02B 5/08* (2013.01); *G02B 6/00* (2013.01); *G02B 6/0011* (2013.01)

(58) Field of Classification Search
CPC . F21S 2/00; G02B 6/0011; G02B 5/08; G02B 1/118; G02B 5/00; G02B 6/00
See application file for complete search history.

(56) References Cited

U.S. PATENT DOCUMENTS 5,771,328 A * 6/1998 Wortman .................. F21V 5/02
                                                        385/146
7,812,899 B2 * 10/2010 Hwang ................ G02B 6/0038
                                                        349/124
(Continued)

FOREIGN PATENT DOCUMENTS

CN     1605909 A    4/2005
CN   102628969 A    8/2012
(Continued)

OTHER PUBLICATIONS

WO2018062309-ETIP2-20190228-8759_isr Machine Translation (Year: 2019).*

(Continued)

*Primary Examiner* — Tracie Y Green
(74) *Attorney, Agent, or Firm* — Paratus Law Group, PLLC

(57) ABSTRACT

There is provided a new and improved optical body, a new and improved method for manufacturing an optical body, and a new and improved light emitting device that can emit light derived from a light source in more various manners. The optical body includes: a base material; and a first concave-convex structure that is formed on at least one surface of the base material and that extracts internally propagating light that is injected into an inside of the base (Continued)

material from a side surface of the base material. An average period of concavity and convexity of the first concave-convex structure is more than or equal to a minimum value of a visible light wavelength band and less than or equal to 10 μm.

9 Claims, 12 Drawing Sheets

(51) Int. Cl.
G02B 5/00 (2006.01)
F21S 2/00 (2016.01)
F21V 8/00 (2006.01)
G02B 5/08 (2006.01)

(56) References Cited

U.S. PATENT DOCUMENTS

| | | | |
|---|---|---|---|
| 8,733,983 B2 | 5/2014 | Matsuzaki et al. | |
| 2005/0099792 A1* | 5/2005 | Matsui | G02B 6/0036 362/603 |
| 2013/0341605 A1* | 12/2013 | Yoo | H01L 51/52 257/40 |
| 2014/0043846 A1 | 2/2014 | Yang et al. | |
| 2014/0140091 A1 | 5/2014 | Vasylyev | |
| 2014/0204608 A1* | 7/2014 | Park | G02B 5/0221 362/607 |
| 2014/0326988 A1* | 11/2014 | Yamaguchi | H05B 33/02 257/40 |
| 2017/0168198 A1* | 6/2017 | Kajiya | B32B 9/00 |
| 2017/0256749 A1* | 9/2017 | Xu | H01L 51/56 |
| 2017/0299778 A1* | 10/2017 | Kajiya | G02B 1/118 |
| 2017/0348943 A1* | 12/2017 | Kajiya | B32B 7/02 |
| 2018/0015641 A1* | 1/2018 | Kajiya | B29C 59/026 |
| 2018/0029251 A1* | 2/2018 | Kajiya | B29C 33/38 |
| 2018/0224578 A1* | 8/2018 | Kajiya | G02B 1/118 |
| 2018/0313980 A1* | 11/2018 | Hayashibe | G02B 1/118 |
| 2019/0101684 A1* | 4/2019 | Hanashima | G02B 6/0025 |
| 2019/0101685 A1* | 4/2019 | Sasaki | G02B 6/0065 |
| 2019/0255742 A1* | 8/2019 | Kajiya | B29C 33/38 |

FOREIGN PATENT DOCUMENTS

| | | |
|---|---|---|
| JP | 2002-048921 A | 2/2002 |
| JP | 2006-010831 A | 1/2006 |
| JP | 2006-012854 A | 1/2006 |
| JP | 2006-147420 A | 6/2006 |
| JP | 2011-017923 A | 1/2011 |
| JP | 2011-220778 A | 11/2011 |
| JP | 2013-148921 A | 8/2013 |
| JP | 2013-214364 A | 10/2013 |
| JP | 2014-194880 A | 10/2014 |
| WO | WO 2010/131430 A1 | 11/2010 |
| WO | WO 2015/115045 A1 | 8/2015 |
| WO | WO 2015/151284 A1 | 10/2015 |

OTHER PUBLICATIONS

Jun. 9, 2020, Chinese Office Action issued for related CN application No. 201780060314.2.
Jun. 3, 2020, European Search Report issued for related EP application No. 17856258.3.
Jun. 23, 2020, Japanese Office Action issued for related JP application No. 2016-191709.
Nov. 10, 2020, Japanese Office Action issued for related JP Application No. 2016-191709.

* cited by examiner

OPTICAL BODY HAVING A CONCAVE-CONVEX STRUCTURE, METHOD FOR MANUFACTURING THE OPTICAL BODY, AND LIGHT EMITTING DEVICE

CROSS REFERENCE TO PRIOR APPLICATION

This application is a National Stage Patent Application of PCT International Patent Application No. PCT/JP2017/035028 (filed on Sep. 27, 2017) under 35 U.S.C. § 371, which claims priority to Japanese Patent Application No. 2016-191709 (filed on Sep. 29, 2016), which are all hereby incorporated by reference in their entirety.

TECHNICAL FIELD

The present invention relates to an optical body, a method for manufacturing an optical body, and a light emitting device.

BACKGROUND ART

As Patent Literatures 1 and 2 disclose, for example, as a kind of optical body, there is known an optical body in which a light waveguiding phenomenon and a macro concave-convex structure are combined. Such an optical body is also called a light guide plate. The macro concave-convex structure is formed on one surface of the light guide plate. Light is injected into the inside of the light guide plate from a light source that is provided on a side surface of the light guide plate. The light injected in the inside of the light guide plate, that is, internally propagating light propagates through the inside of the light guide plate while reflecting at surfaces of the light guide plate (that is, interfaces between the inside and the outside of the light guide plate). After that, the internally propagating light is reflected at a surface of the macro concave-convex structure, and is emitted from another surface of the light guide plate. That is, the light guide plate emits light injected from a side surface of the light guide plate, from a surface of the light guide plate. The light guide plate is used as, for example, light emitting bodies for various display devices or light emitting bodies for illumination. Examples of the display device in which a light guide plate is used include various LCDs (for example, an LCD of a local dimming driving system), passive-type display devices, light ornamentation panels for amusement, illumination panels for advertisements such as digital signage, etc. In these display devices, an expression looking as if light stood out from a place where a pattern of a macro concave-convex structure is formed is enabled by the turning on and off of the light source.

CITATION LIST

Patent Literature

Patent Literature 1: JP 2002-48921A
Patent Literature 2: JP 2011-220778A

SUMMARY OF INVENTION

Technical Problem

However, the conventional light guide plate has been able only to emit internally propagating light as it is. For example, in the case where a white light source is used as the light source of the light guide plate, the light guide plate has been able to emit only light of white color. Hence, there has been a problem that the designability of the light guide plate is limited.

Thus, the present invention has been made in view of the problem mentioned above, and an object of the present invention is to provide a new and improved optical body, a new and improved method for manufacturing an optical body, and a new and improved light emitting device that can emit light derived from a light source in more various manners.

Solution to Problem

To solve the problem described above, according to an aspect of the present invention, there is provided an optical body including: a base material; and a first concave-convex structure that is formed on at least one surface of the base material and that extracts internally propagating light that is injected into an inside of the base material from a side surface of the base material. An average period of concavity and convexity of the first concave-convex structure is more than or equal to a minimum value of a visible light wavelength band and less than or equal to 10 μm.

Here, a second concave-convex structure that is formed in, of both surfaces of the base material, a region where the first concave-convex structure is not formed and in which an average period of concavity and convexity is less than the minimum value of the visible light wavelength band may be further included.

In addition, an average height of convex portions of the second concave-convex structure may be more than or equal to 150 nm.

In addition, a pitch of concavity and convexity included in the first concave-convex structure may be in a random way.

In addition, a pitch of concavity and convexity included in the first concave-convex structure may have periodicity.

In addition, an average height of convex portions of the first concave-convex structure may be more than or equal to 100 nm.

According to another aspect of the present invention, there is provided a master on a surface of which an inverse shape of the optical body according to any one of claims 1 to 6 is formed.

According to another aspect of the present invention, there is provided a method for manufacturing an optical body including: a step of producing a master on a surface of which an inverse shape of the optical body according to any one of claims 1 to 6 is formed; and a step of transferring a surface shape of the master onto a base material.

According to another aspect of the present invention, there is provided a light emitting device including: the above optical body; and a light source that is provided on a side surface of the optical body and injects light into an inside of the optical body from the side surface of the optical body.

Advantageous Effects of Invention

As described above, according to the present invention, light in a manner in accordance with the shape of the first concave-convex structure can be extracted (that is, emitted). Therefore, light derived from a light source can be emitted in more various manners.

DESCRIPTION OF EMBODIMENTS

Figure 1:
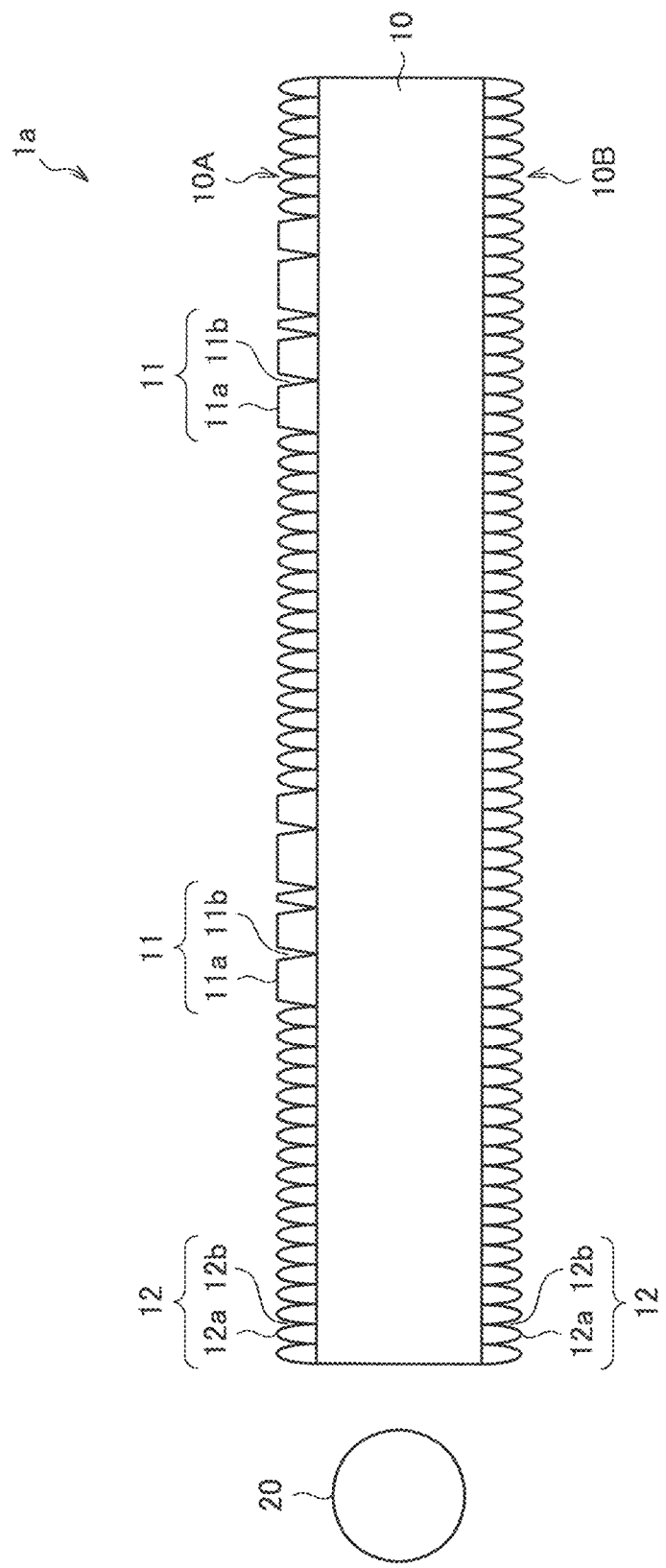
FIG. 1 is a side cross-sectional view showing a rough configuration of an optical body according to an embodiment of the present invention.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Configuration of Optical Body>

Next, the configuration of an optical body 1a according to the present embodiment is described on the basis of FIG. 1 to FIG. 4. The optical body 1a includes a base material 10, a first concave-convex structure 11, and a second concave-convex structure 12.

The base material 10 propagates light injected in the inside of the base material 10, that is, internally propagating light in planar directions of the base material 10 (that is, directions perpendicular to the thickness direction; in FIG. 1, horizontal directions). Hence, the base material 10 is formed of a resin excellent in light conductivity, preferably a thermoplastic resin. Examples of such a resin include polymethyl methacrylate, a polycarbonate, A-PET, a cycloolefin copolymer, a cycloolefin polymer, and the like. The base material 10 may be formed of also an inorganic material excellent in light conductivity. Examples of such an inorganic material include silicon-based materials, more specifically glass and the like. The thickness of the base material 10 is not particularly limited, and may be adjusted in accordance with the use, etc. of the optical body 1a, as appropriate.

Figure 2:
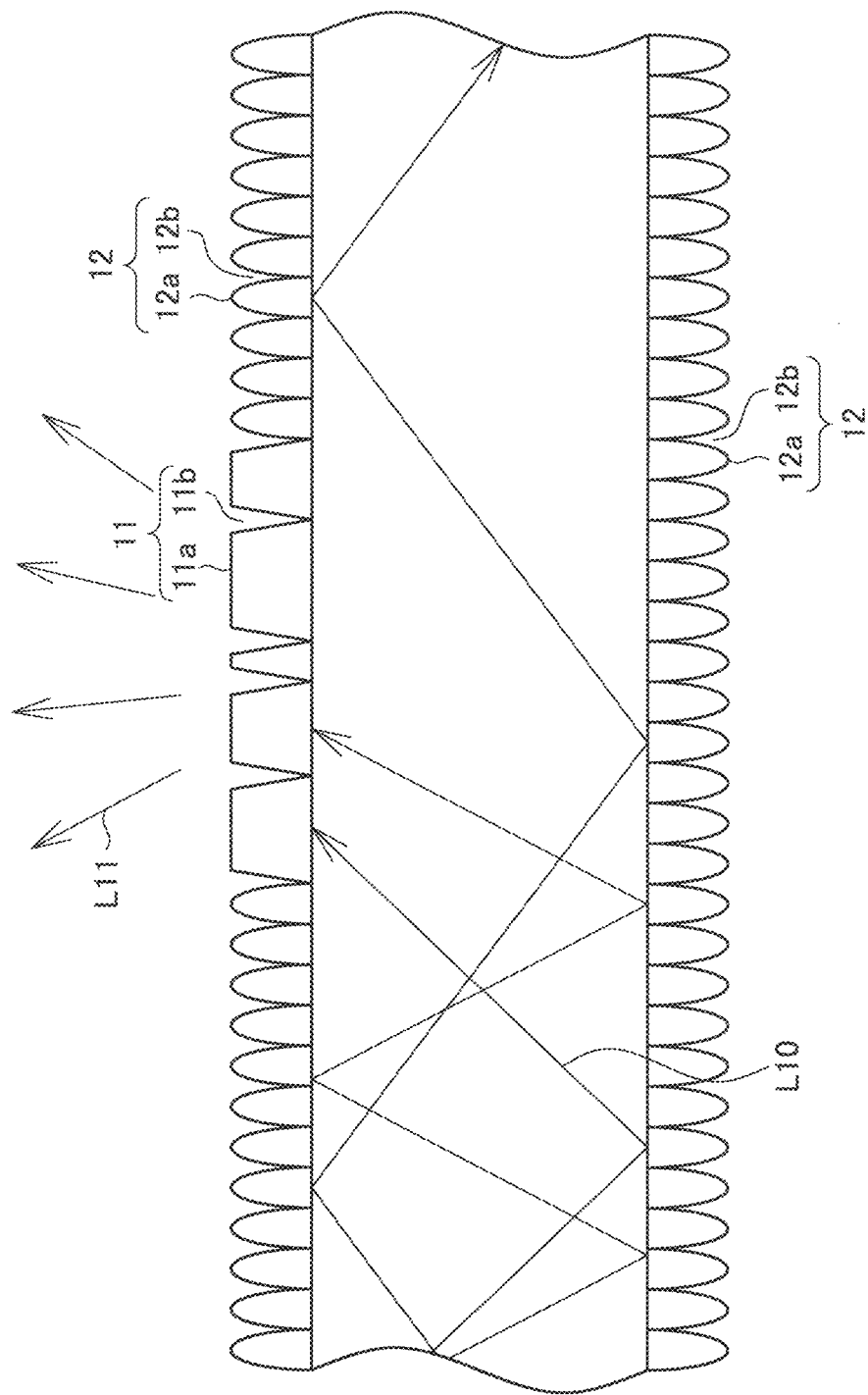
FIG. 2 is a side cross-sectional view showing an enlarged view of part of the optical body according to the embodiment.

The first concave-convex structure 11 is formed on at least one surface 10A of the base material 10. As shown in FIG. 2, the first concave-convex structure 11 extracts internally propagating light, and emits the internally propagating light to the outside. Straight line L10 of FIG. 2 shows an optical path of internally propagating light, and straight line L11 shows an optical path of light extracted to the outside, that is, extraction light. That is, internally propagating light that has reached the first concave-convex structure 11 is emitted to the outside by a light diffraction phenomenon. The first concave-convex structure 11 is formed in a place of the surface 10A from which light is intended to be extracted. The first concave-convex structure 11 may be formed also on another surface 10B.

Figure 3:
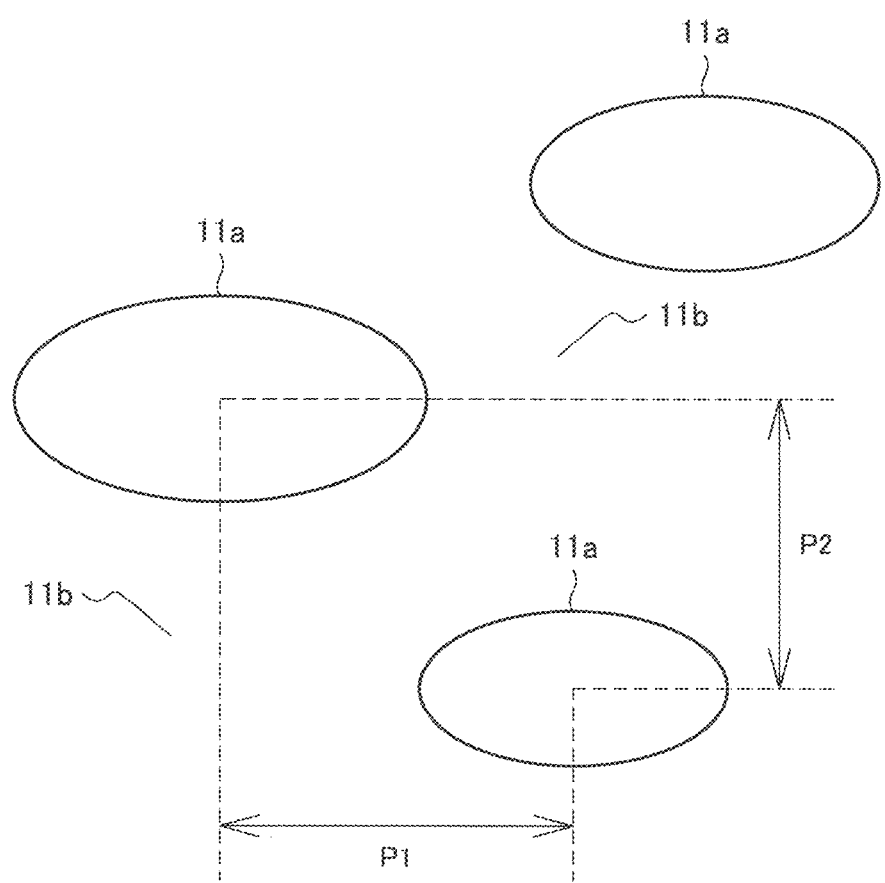
FIG. 3 is a plan view showing an example of a first concave-convex structure.

Here, the configuration of the first concave-convex structure 11 is described in detail on the basis of FIG. 1 to FIG. 3. The first concave-convex structure 11 has a large number of light extraction convexities 11a and a large number of light extraction concavities 11b. The light extraction convexity 11a has a shape protruding on the outside in the thickness direction of the optical body 1a, and the light extraction concavity 11b has a shape recessed on the inside in the thickness direction of the optical body 1a.

The light extraction convexity 11a and the light extraction concavity 11b are formed randomly on the one surface 10A. That is, the pitch of concavity and convexity of the first concave-convex structure 11 is in a random way. More specifically, as shown in FIG. 3, it can be said that the first concave-convex structure 11 is a structure in which concavities and convexities are arranged scatteredly in a matrix configuration. Thus, the pitch of concavity and convexity can be classified into a pitch in a row direction (what is called a dot pitch) P1 and a pitch in a column direction (what is called a track pitch) P2. The dot pitch P1 is more specifically the distance between the apices of light extraction convexities 11a adjacent in the row direction, and the track pitch P2 is the distance between the apices of light extraction convexities 11a adjacent in the column direction. As shown in FIG. 3, the dot pitch P1 and the track pitch P2 are in a random way. Further, the shape of concavity and convexity is in a random way. That is, the light extraction convexities 11a have mutually different shapes, and the light extraction concavities 11b have mutually different shapes. Here, light extraction convexities 11a may be linked together. On the other hand, the shapes of the concavities and the convexities may coincide.

Further, the average period of concavity and convexity of the first concave-convex structure 11 is more than or equal to the minimum value of the visible light wavelength band and less than or equal to 10 μm. Here, the average period of concavity and convexity is given as the arithmetic average value of the dot pitches P1 and the track pitches P2. For example, a plurality of sets of light extraction convexities 11a adjacent in the row direction and a plurality of sets of light extraction convexities 11a adjacent in the column direction are picked out, and the dot pitches P1 and the track pitches P2 of these sets are calculated. Then, the arithmetic average value of the calculated pitches may be taken as the average period of concavity and convexity.

The average period of concavity and convexity of the first concave-convex structure 11 is more than or equal to the minimum value of the visible light wavelength band, as described above. For example, the average period of concavity and convexity is more than or equal to 270 nm, preferably more than or equal to 280 nm, and more preferably more than or equal to 350 nm. The average period of concavity and convexity is less than or equal to 10 μm. In the case where the average period of concavity and convexity is a value in the range described above, internally propagating light can be extracted to the outside more efficiently. Here, the pitch of concavity and convexity is in a random way, and therefore light with various frequencies can be extracted.

Hence, when the internally propagating light is white light, white light can be extracted. On the other hand, when the internally propagating light is monochromatic light, monochromatic light with the same frequency as the frequency of the internally propagating light can be extracted.

The average height of the first concave-convex structure 11 (specifically, the average height of the light extraction convexities 11a) is not particularly limited, but is preferably more than or equal to 100 nm. In this case, extraction light can be extracted with better efficiency.

Figure 10:
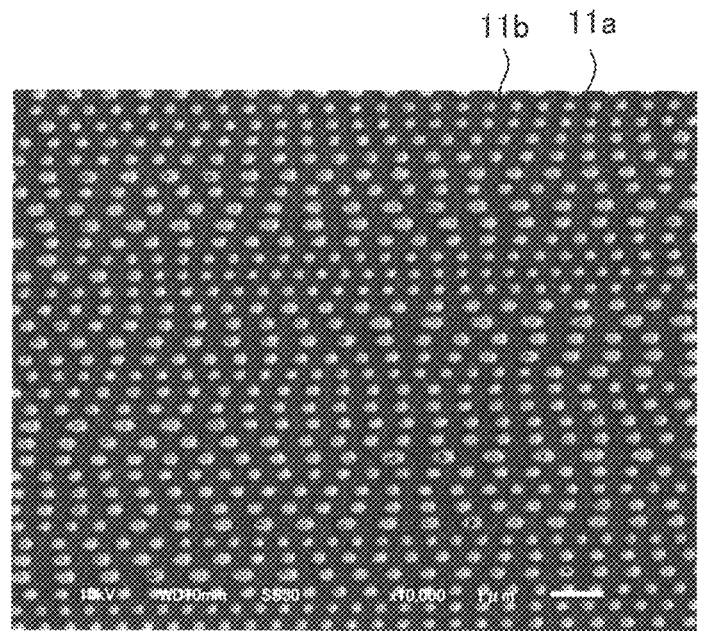
FIG. 10 is a planar SEM photograph showing an example of the first concave-convex structure.
Figure 11:
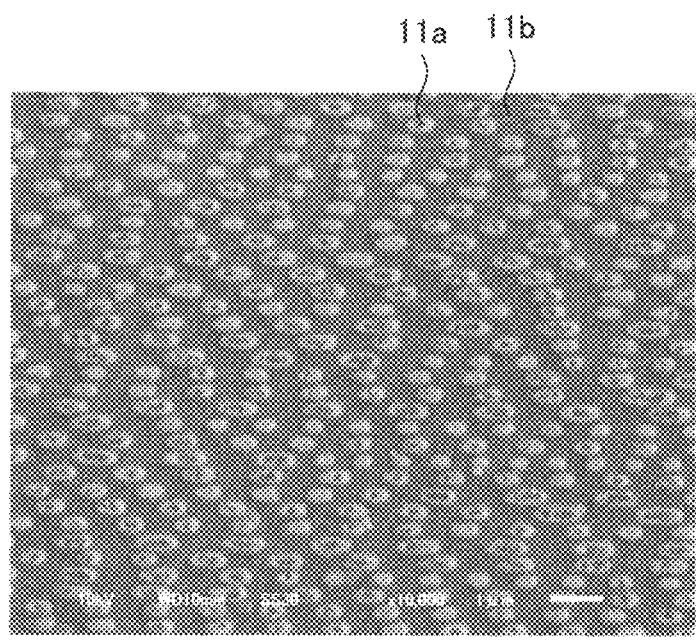
FIG. 11 is a planar SEM photograph showing an example of the first concave-convex structure.
Figure 12:
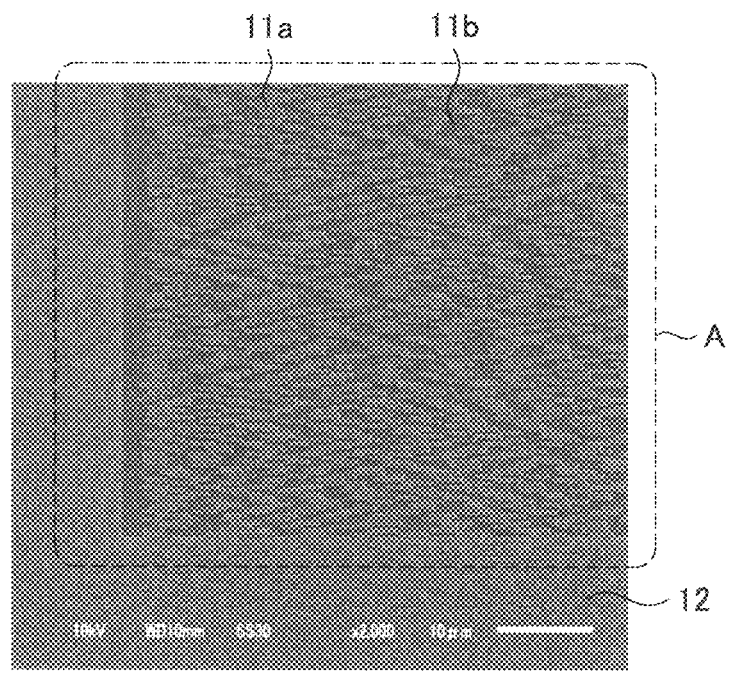
FIG. 12 is a planar SEM photograph showing an example of the first concave-convex structure.

Here, the first concave-convex structure 11 can be observed with a scanning electron microscope (SEM), a cross-sectional transmission electron microscope (cross-sectional TEM), or the like, for example. FIG. 10 to FIG. 12 show examples of planar SEM photographs of the first concave-convex structure 11. The magnification of FIGS. 10 and 11 is 10,000 times, and the magnification of FIG. 12 is 2,000 times. In FIG. 12, the concavities and the convexities in region A form the first concave-convex structure 11. The second concave-convex structure 12 is formed around region A. In the examples of FIG. 10 and FIG. 11, the pitch of concavity and convexity is in a random way, and also the shape of concavity and convexity is in a random way. In the example of FIG. 12, light extraction convexities 11a are linked together. The average height of the first concave-convex structure 11 can be measured by a cross-sectional SEM. The heights of some light extraction convexities 11a may be measured by a cross-sectional SEM, and the arithmetic average value of these heights may be taken as the average height.

The second concave-convex structure 12 is formed in, of both surfaces of the base material 10, regions where the first concave-convex structure 11 is not formed. In the present embodiment, the second concave-convex structure 12 is formed in the entire region of the other surface 10B of the base material 10 and regions of the one surface 10A of the base material 10 where the first concave-convex structure 11 is not formed. As shown in FIG. 2, the second concave-convex structure 12 suppresses the diffraction, that is, the leakage to the outside of internally propagating light. That is, internally propagating light that has reached the second concave-convex structure 12 is caused to reflect in the base material 10. Thus, the optical body 1a can emit internally propagating light to the outside through the first concave-convex structure 11. Therefore, the optical body 1a can be considered to be a kind of light guide plate. The optical body 1a needs only to have at least the first concave-convex structure 11, and may not have the second concave-convex structure 12. However, by forming the second concave-convex structure 12 on the base material 10, the leakage of internally propagating light to the outside can be suppressed, and furthermore the reflection of extraneous light can be suppressed.

Figure 4:
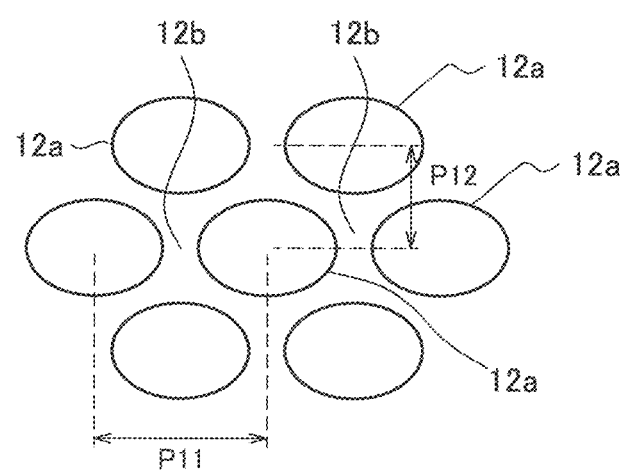
FIG. 4 is a plan view showing an example of a second concave-convex structure.

Here, the configuration of the second concave-convex structure 12 is described in detail on the basis of FIG. 1, FIG. 2, and FIG. 4. The second concave-convex structure 12 has a large number of diffraction suppression convexities 12a and a large number of diffraction suppression concavities 12b. The diffraction suppression convexity 12a has a shape protruding on the outside in the thickness direction of the optical body 1a, and the diffraction suppression concavity 12b has a shape recessed on the inside in the thickness direction of the optical body 1a.

The diffraction suppression convexity 12a and the diffraction suppression concavity 12b are formed periodically on both surfaces of the base material 10. That is, the pitch of concavity and convexity of the second concave-convex structure 12 has periodicity. More specifically, as shown in FIG. 4, it can be said that the second concave-convex structure 12 is a structure in which concavities and convexities are arranged scatteredly in a matrix configuration. Thus, the pitch of concavity and convexity can be classified into a pitch in a row direction (what is called a dot pitch) P11 and a pitch in a column direction (what is called a track pitch) P12. The dot pitch P11 is more specifically the distance between the apices of diffraction suppression convexities 12a adjacent in the row direction, and the track pitch P12 is the distance between the apices of diffraction suppression convexities 12a adjacent in the column direction. As shown in FIG. 4, each of the dot pitch P11 and the track pitch P12 is a fixed value. Further, the arrangement of diffraction suppression convexities 12a is what is called a zigzag arrangement. The dot pitch P11 and the track pitch P12 may be the same, or be different. Further, the dot pitch P11 and the track pitch P12 may vary in fixed periods. For example, the dot pitch P11 may vary in the row direction in a sine wave sweeping manner. In this case, a graph showing a corresponding relationship between the distance in the row direction and the dot pitch P11 forms a sine waveform. Further, all the shapes of the diffraction suppression convexities 12a are substantially the same. The second concave-convex structure 12 formed on the one surface 10A of the base material 10 and the second concave-convex structure 12 formed on the other surface 10B may be the same, or be different.

Further, the average period of concavity and convexity of the second concave-convex structure 12 is less than the minimum value of the visible light wavelength band. Here, the average period of concavity and convexity is given as the arithmetic average value of the dot pitches P11 and the track pitches P12. For example, a plurality of sets of diffraction suppression convexities 12a adjacent in the row direction and a plurality of sets of diffraction suppression convexities 12a adjacent in the column direction are picked out, and the dot pitches P11 and the track pitches P12 of these sets are calculated. Then, the arithmetic average value of the calculated pitches may be taken as the average period of concavity and convexity.

The average period of concavity and convexity of the second concave-convex structure 12 is less than the minimum value of the visible light wavelength band, as described above. For example, the average period of concavity and convexity is less than 350 nm, preferably less than 280 nm, and more preferably less than 270 nm. Further, the average period of concavity and convexity of the second concave-convex structure 12 is smaller than the average period of concavity and convexity of the first concave-convex structure 11. The lower limit value of the average period of concavity and convexity is not particularly limited, but is preferably more than or equal to 100 nm from the viewpoint of stably forming the second concave-convex structure 12. In the case where the average period of concavity and convexity is a value in the range described above, the leakage of internally propagating light can be suppressed more reliably.

The average height of the second concave-convex structure 12 (specifically, the average height of the diffraction suppression convexities 12a) is not particularly limited, but is preferably more than or equal to 150 nm. In this case, the diffraction of internally propagating light can be suppressed more.

Figure 13:
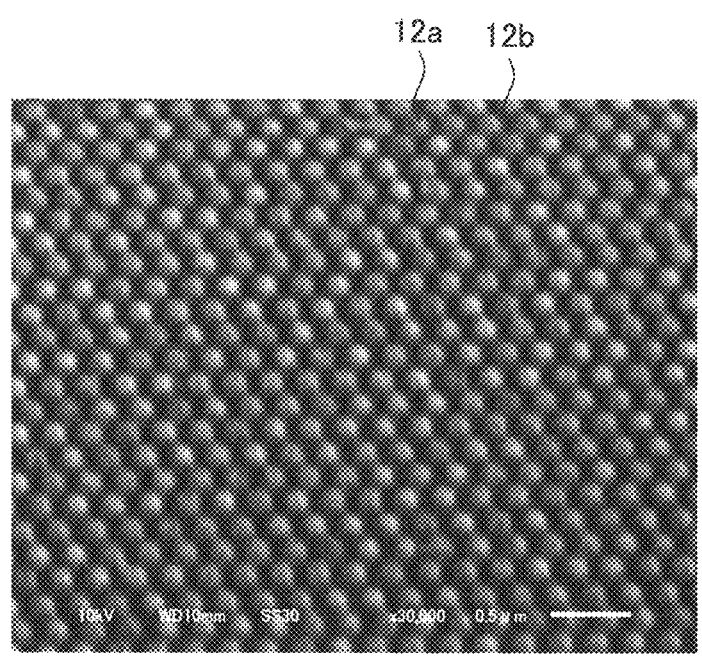
FIG. 13 is a planar SEM photograph showing an example of the second concave-convex structure.

Here, the second concave-convex structure 12 can be observed with a scanning electron microscope (SEM), a cross-sectional transmission electron microscope (cross-sectional TEM), or the like, for example. FIG. 13 shows an example of a planar SEM photograph of the second concave-convex structure 12. The magnification of FIG. 13 is 30,000 times. In the example of FIG. 13, the concave-convex arrangement is a zigzag arrangement. As a matter of course, the concave-convex arrangement is not limited to a zigzag arrangement. For example, the concave-convex arrangement may be a rectangular arrangement or the like. The average height of the second concave-convex structure 12 can be measured by a cross-sectional SEM. The heights of some diffraction suppression convexities 12a may be measured by a cross-sectional SEM, and the arithmetic average value of these heights may be taken as the average height.

Here, each of the first concave-convex structure 11 and the second concave-convex structure 12 is formed of a cured curing resin, for example. That is, although details are described later, each of the first concave-convex structure 11 and the second concave-convex structure 12 is formed by transferring the surface shape of a master 100 (the surface shape of the master 100 has the inverse shape of the first concave-convex structure 11 and the second concave-convex structure 12) to an uncured resin layer that is formed on the surface of the base material 10 in advance and then curing the uncured resin layer. Thus, the first concave-convex structure 11 and the second concave-convex structure 12 can be formed by one master 100 on either surface of the base material 10, and therefore the optical body 1a can be produced easily. In the case where the shapes of both surfaces of the base material 10 are different, masters 100 in accordance with the respective shapes may be prepared. Thus, in the present embodiment, a master, a press machine, etc. for a macro concave-convex structure are unnecessary.

The concave-convex structure 12 is made up of a cured curing resin, for example. The cured curing resin is preferably transparent. The curing resin includes a polymerizable compound and a curing initiator. The polymerizable compound is a resin that is cured by the curing initiator. The polymerizable compound may be a compound such as a polymerizable epoxy compound or a polymerizable acrylic compound, for example. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, N-vinyl pyrrolidone, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl)ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane acrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactone, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers. From the perspective of transparency of the optical body 1a, the polymerizable compound preferably is a polymerizable acrylic compound.

The curing initiator is a material that cures the curing resin. Examples of the curing initiator include thermal curing initiators and light-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a light-curing initiator, the curing resin is a light-curing resin.

Herein, from the perspective of transparency of the optical body 1a, the curing initiator preferably is an ultraviolet-curing initiator. Consequently, the curing resin preferably is an ultraviolet-curing acrylic resin. An ultraviolet-curing initiator is a type of light-curing initiator. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one.

In addition, the first concave-convex structure 11 and the second concave-convex structure 12 may be a resin imparted with functionality such as hydrophilicity, water repellency, anti-fogging, and the like.

Additionally, additives may also be added to the first concave-convex structure 11 and the second concave-convex structure 12 depending on the purpose of the optical body 1a. Examples of additives include inorganic fillers, organic fillers, leveling agents, surface conditioners, and antifoaming agents. Note that examples of types of inorganic fillers include metallic oxide particles such as $SiO_2$, $TiO_2$, $ZrO_2$, $SnO_2$, and $Al_2O_3$.

The first concave-convex structure 11 and the second concave-convex structure 12 may be formed directly on both surfaces of the base material 10, but a resin film (for example, a thermoplastic resin film) on which the first concave-convex structure 11 and the second concave-convex structure 12 are formed may be adhered to each of both surfaces of the base material 10.

<2. Modification Example of Optical Body>

Figure 5:
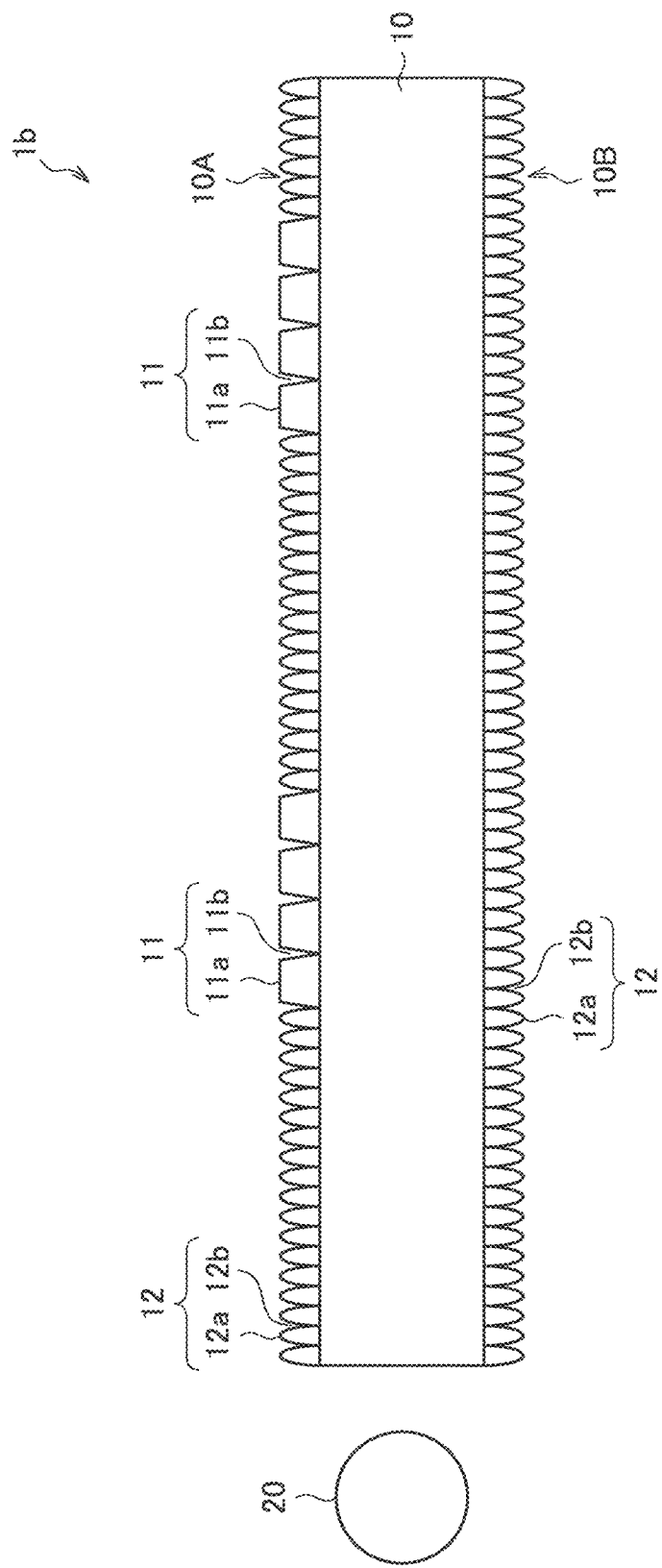
FIG. 5 is a side cross-sectional view showing a modification example of the optical body.
Figure 6:
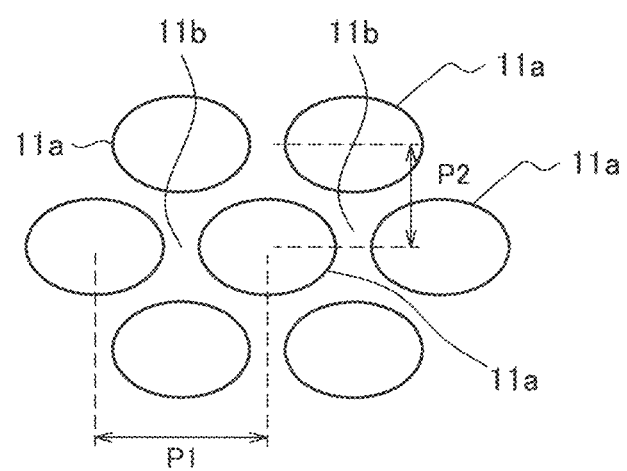
FIG. 6 is a plan view showing an example of a first concave-convex structure according to the modification example.

Next, the configuration of an optical body 1b that is a modification example of the optical body 1a is described on the basis of FIG. 5 and FIG. 6. In the optical body 1b, the concavity and convexity of the first concave-convex structure 11 have periodicity similar to those of the second concave-convex structure 12. That is, each of the dot pitch P1 and the track pitch P2 is a fixed value. Further, as shown in FIG. 6, the arrangement of light extraction convexities 11a may be a zigzag arrangement, for example. As a matter of course, the concave-convex arrangement is not limited to a zigzag arrangement. For example, the concave-convex arrangement may be a rectangular arrangement or the like. The dot pitch P1 and the track pitch P2 may be the same, or be different. Further, the dot pitch P1 and the track pitch P2 may vary in fixed periods. For example, the dot pitch P1 may vary in the row direction in a sine wave sweeping manner. In this case, a graph showing a corresponding relationship between the distance in the row direction and the dot pitch P1 forms a sine waveform. Further, all the shapes of the light extraction convexities 11a are substantially the same. However, the average period of concavity and convexity of the first concave-convex structure 11 is in a range similar to the range in the optical body 1a, that is, more than or equal to the minimum value of the visible light wavelength band and less than or equal to 10 μm.

In this modification example, light with a frequency in accordance with the average period of concavity and convexity of the first concave-convex structure 11 can be extracted from the optical body 1b. For example, in the case where the internally propagating light is white light and the average period of concavity and convexity is 370 nm, the extraction light is blue light. Further, in the case where the average period of concavity and convexity is 400 nm, the extraction light is green light. Further, in the case where the average period of concavity and convexity is 500 nm, the extraction light is yellow light. Further, in the case where the average period of concavity and convexity is 600 nm, the extraction light is red light. The larger the average period is, the larger the luminance of extraction light tends to be. Further, in the case where the internally propagating light is monochromatic light, light is extracted in the following manner. That is, internally propagating light is extracted from the first concave-convex structure 11 to the outside in the case where the internally propagating light corresponds to the average period of the first concave-convex structure 11.

Thus, light in a manner in accordance with the shape of the first concave-convex structure 11 can be extracted by the optical bodies 1a and 1b. For example, in the case where the light source emits white light and the pitch of the first concave-convex structure 11 is in a random way, white light can be extracted. Further, in the case where the light source emits white light and the pitch of the first concave-convex structure 11 has periodicity, light of a color in accordance with the average period of concavity and convexity of the first concave-convex structure 11 can be extracted. Hereinafter, the optical bodies 1a and 1b may be collectively referred to as an optical body 1.

Although in the examples of FIG. 1 and FIG. 5 the first concave-convex structure 11 and the second concave-convex structure 12 are formed directly on the base material 10, a resin film on which either or both of the first concave-convex structure 11 and the second concave-convex structure 12 are formed may be stuck to the base material 10. In the example of FIG. 1, a resin film on which the first concave-convex structure 11 and the second concave-convex structure 12 are formed may be stuck to the one surface 10A of the base material 10, and a resin film on which the second concave-convex structure 12 is formed may be stuck to the other surface 10B of the base material 10.

<3. Configuration of Light Emitting Device>

Next, the configuration of a light emitting device is described on the basis of FIG. 1. The light emitting device includes the optical body 1a described above and a light source 20. The kind of the light source 20 is not particularly questioned, and may be a light source used for a conventional light guide plate. That is, the light source 20 may be one that emits white light, or one that emits monochromatic light. The optical body 1b may be used in place of the optical body 1a. The operation of the light emitting device is roughly as follows. First, light is injected into the optical body 1 from the light source 20. The light injected in the inside of the optical body 1, that is, internally propagating light propagates through the inside of the optical body 1 while reflecting at both surfaces of the optical body 1 (that is, the interfaces between the inside and the outsides of the optical body 1). Here, the second concave-convex structure 12 is formed on each of both surfaces of the optical body 1, and therefore the leakage of internally propagating light to the outside can be suppressed.

Part of the internally propagating light reaches the first concave-convex structure 11. The internally propagating light that has reached the first concave-convex structure 11 is extracted from the first concave-convex structure 11 to the outside. The manner of the light extracted to the outside, that is, extraction light is in accordance with the shape of the first concave-convex structure 11.

The average period of concavity and convexity of the second concave-convex structure 12 is less than the minimum value of the visible light wavelength band, and therefore the reflection of extraneous light can be suppressed. Thus, the optical body 1 has an excellent anti-reflection function to extraneous light, and can therefore allow the observer to visually recognize a clearer light emission pattern (that is, a light emission pattern based on the extraction light). That is, the contrast between the light emitting portion and the non-light emitting portion is enhanced.

<4. Configuration of Master>

Figure 7:
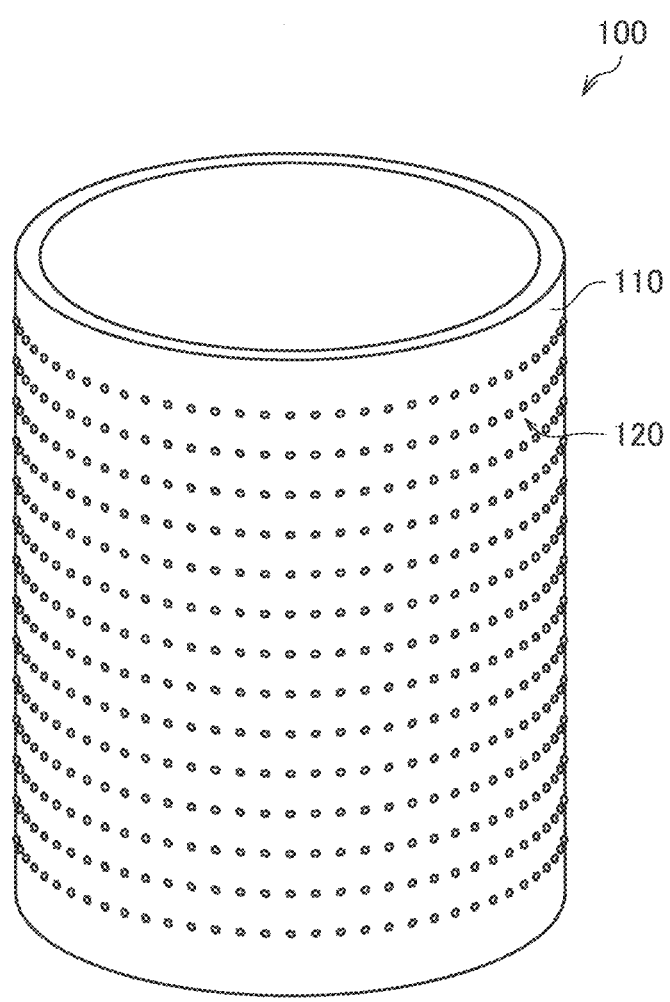
FIG. 7 is a perspective diagram illustrating an exemplary appearance of a master according to the present embodiment.

The first concave-convex structure 11 and the second concave-convex structure 12 are produced using the master 100 illustrated in FIG. 7, for example. Accordingly, the configuration of the master 100 will be described next. The master 100 is a master used in a nanoimprint method, and has a hollow round cylindrical shape, for example. The master 100 may also have a round columnar shape, or another shape (for example, a planar shape). However, if the master 100 has a round columnar or hollow round cylindrical shape, a concave-convex structure 120 of the master 100 (in other words, the master concave-convex structure) may be transferred seamlessly to a resin base material or the like with a roll-to-roll method. Consequently, the optical body 10 with the master concave-convex structure 120 of the master 100 transferred thereonto may be produced with high production efficiency. From such a perspective, the shape of the master 100 is preferably a hollow round cylindrical shape or a round columnar shape.

The master 100 is provided with a master base material 110, and the master concave-convex structure 120 formed on the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix. The shape of the master base material 110 is a hollow round cylindrical shape, but may also be a round columnar shape, or some other shape. However, as described above, the master base material 110 preferably has a hollow round cylindrical shape or a round columnar shape. The master concave-convex structure 120 has the inverse shape of the surface shape of the optical body 1 (for example, the inverse shape of the first concave-convex structure 11 and the second concave-convex structure 12 formed on the one surface 10A of the base material 10, or the inverse shape of the second concave-convex structure 12 formed on the other surface 10B of the base material 10).

<5. Method of Manufacturing Master>

Next, a method of manufacturing the master 100 will be described. First, a base material resist layer is formed (deposited) on the master base material 110. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 110 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 8), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the master concave-convex structure 120 may be formed in the base material resist layer.

Next, by dripping a developing solution onto the base material resist layer in which is formed the latent image, the base material resist layer is developed. As a result, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. By the above steps, the master 100 is produced. Note that anodic porous alumina obtained by the anodic oxidation of aluminum may also be used as the master. Anodic porous alumina is disclosed in WO 2006/059686, for example. Additionally, the master 100 may also be produced by a stepper using a reticle mask with an asymmetric shape.

<6. Configuration of Exposure Device>

Figure 8:
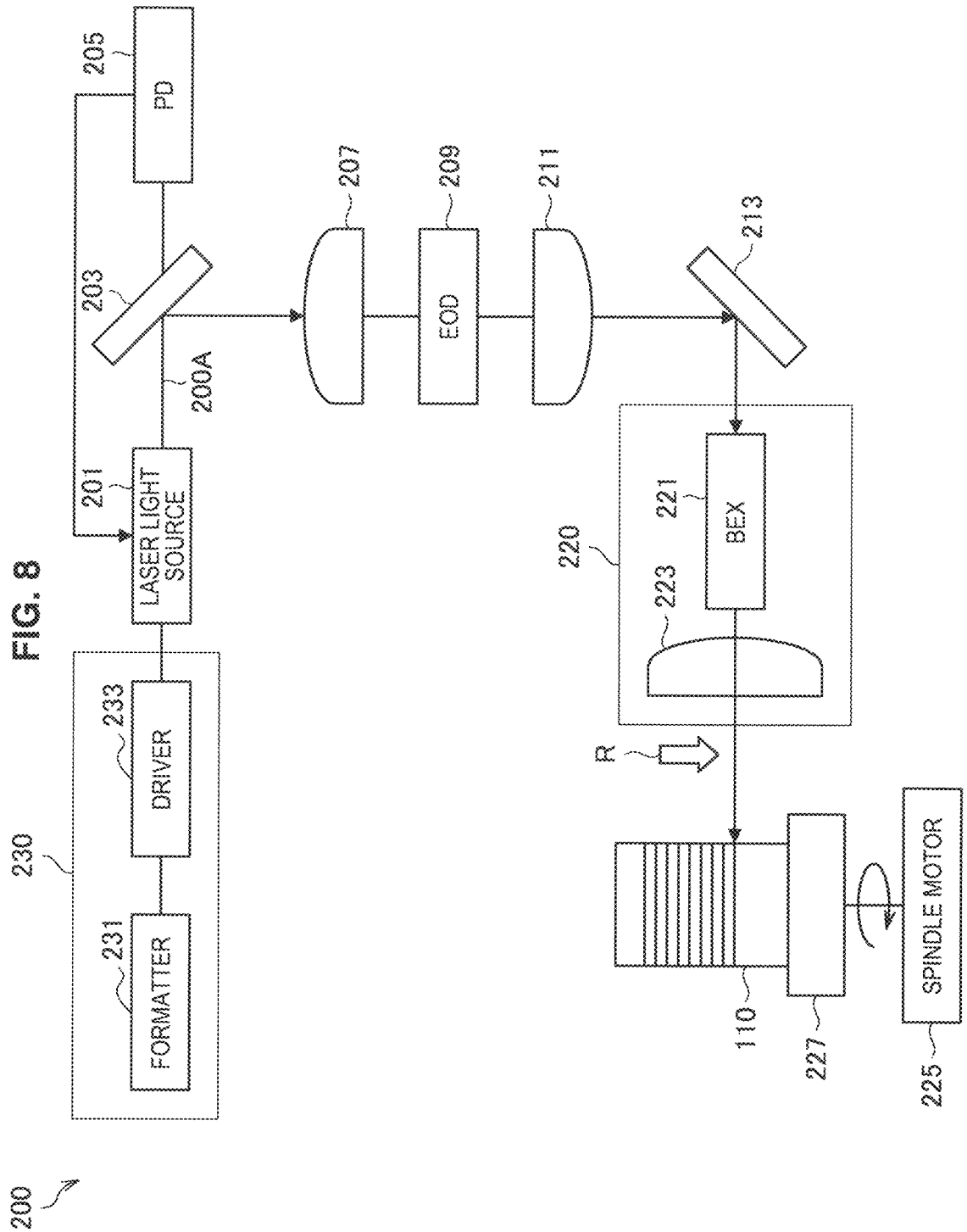
FIG. 8 is a block diagram illustrating an exemplary configuration of an exposure device.

Next, the configuration of the exposure device 200 will be described on the basis of FIG. 8. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 110 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. With this arrangement, the laser light 200A is made to scan over the base material resist layer. At this point, a latent image of the base material resist layer is formed along the scanning direction of the laser light 200A.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 110 by the laser light 200A is controlled.

The formatter 231 generates a control signal for irradiating the base material resist layer with the laser light 200A, on the basis of an input image depicting an arbitrary pattern to draw on the base material resist layer. Specifically, first, the formatter 231 acquires an input image depicting an arbitrary draw pattern to draw on the base material resist layer. The input image is an image corresponding to a development of the outer circumferential surface of the base material resist layer, in which the outer circumferential surface of the base material resist layer is cut in the axial direction and expanded in a single plane. In this development, an image corresponding to the circumferential shape of the master 100 is depicted. This image shows the inverse shape of the surface shape of the optical body 1.

Next, the formatter 231 partitions the input image into sub-regions of a certain size (for example, partitions the input image into a lattice), and determines whether or not the concave draw pattern (that is, a pattern corresponding to the concavities of the master 100) is included in each of the sub-regions. Subsequently, the formatter 231 generates a control signal to perform control to irradiate with the laser light 200A each sub-region determined to include the concave draw pattern. The control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. As a result, the irradiation of the base material resist layer by the laser light 200A is controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may irradiate the base material resist layer after being split into multiple optical subsystems. In this case, multiple irradiation spots are formed on the base material resist layer. In this case, when the laser light 200A emitted from one optical system reaches the latent image formed by another optical system, exposure may be ended.

Therefore, in the present embodiment, a latent image in accordance with the draw pattern of the input image can be formed on the resist layer. Then, the resist layer is developed, and the resist layer after development is used as a mask to etch the master base material 110 and the base material resist layer; thereby, a master concave-convex structure 120 in accordance with the draw pattern of the input image is formed on the master base material 110. That is, an arbitrary master concave-convex structure 120 in accordance with the draw pattern can be formed. Thus, when a draw pattern in which the inverse shape of the optical body 1 has been depicted is prepared as the draw pattern, a master concave-convex structure 120 having the inverse shape of the optical body 1 can be formed.

<7. Method of Manufacturing Optical Body Using Master>

Figure 9:
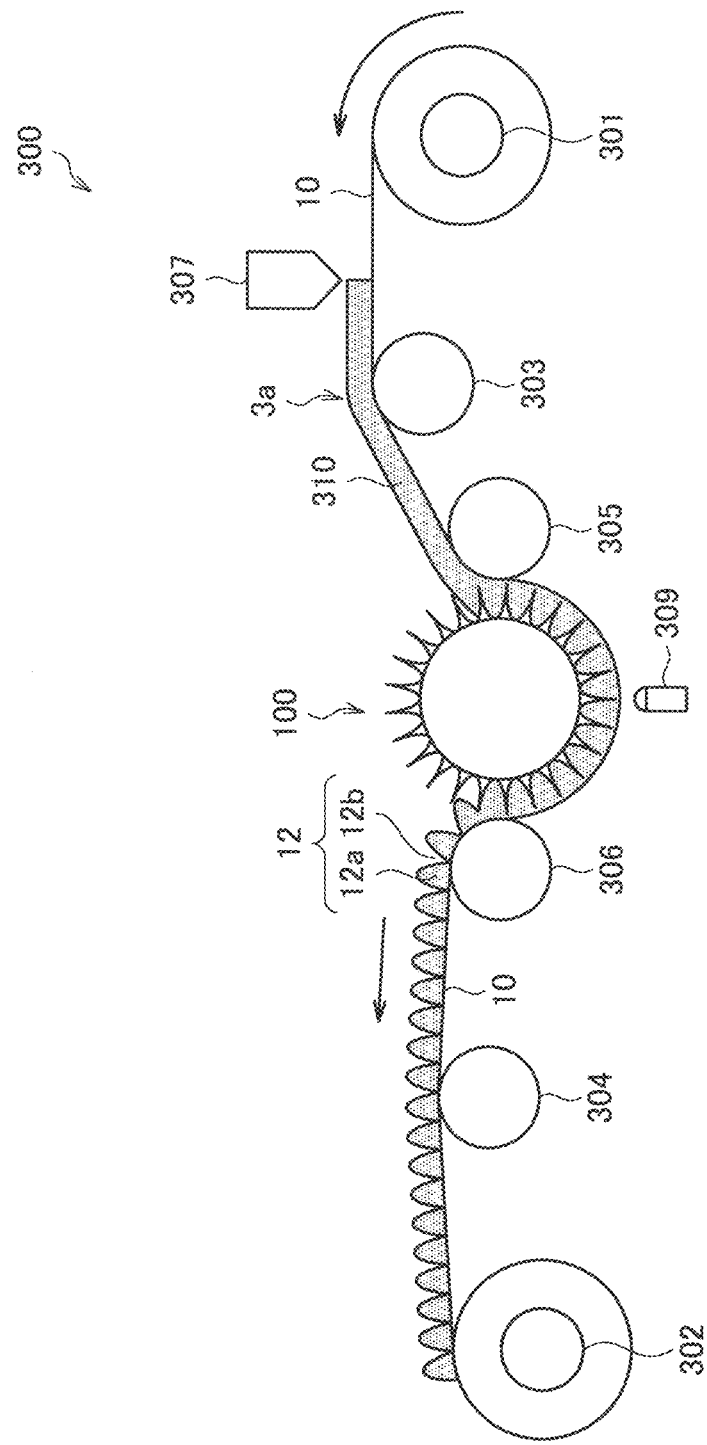
FIG. 9 is a schematic diagram illustrating an example of a transfer device that manufactures an optical body by roll-to-roll.

Next, an example of a method of manufacturing the optical body 1 using the master 100 will be described with reference to FIG. 9. The optical body 1 can be manufactured by a roll-to-roll transfer device 300 using the master 100. In the transfer device 300 illustrated in FIG. 9, the optical body 1 is produced using a light-curing resin. FIG. 9 is a cross-sectional view taken along a track (row) in which only the second concave-convex structure 12 exists.

The transfer device 300 is provided with the master 100, a base material supply roll 301, a take-up roll 302, guide rolls 303 and 304, a nip roll 305, a separation roll 306, an applicator device 307, and a light source 309.

The base material supply roll 301 is a roll around which a long-length base material 10 is wound in a roll, while the take-up roll 302 is a roll that takes up the optical body 1. Also, the guide rolls 303 and 304 are rolls that transport the base material 10. The nip roll 305 is a roll that puts the base material 10 laminated with an uncured resin layer 310, or in other words a transfer film 3a, in close contact with the master 100. The separation roll 306 is a roll that separates the optical body 1 from the master 100.

The applicator device 307 is provided with an applicating means such as a coater, and applies an uncured light-curing resin composition to the base material 10, and forms the uncured resin layer 310. The applicator device 307 may be a device such as a gravure coater, a wire bar coater, or a die coater, for example. Also, the light source 309 is a light source that emits light of a wavelength able to cure the light-curing resin composition, and may be a device such as an ultraviolet lamp, for example.

In the transfer device 300, first, the base material 10 is sent continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material 10, and the uncured resin layer 310 is laminated onto the base material 10. As a result, the transfer film 3a is prepared. The transfer film 3a is put into close contact with the master 100 by the nip roll 305. The light source 309 irradiates with light the uncured resin layer 310 put in close contact with the master 100, thereby curing the uncured resin layer 310. With this arrangement, the arrangement pattern of the master concave-convex structure 120 formed on the outer circumferential face of the master 100 is transferred to the uncured resin layer 310. In other words, the concave-convex structure having the inverse shape of the master concave-convex structure 120 is formed on the base material 10. Next, the base material 10 in which the concave-convex structure is formed, or in other words the optical body 1, is separated from the master 100 by the separation roll 306. Next, the optical body 1 is taken up by the take-up roll 302 via the guide roll 304. Note that the master 100 may be oriented vertically or oriented horizontally, and a mechanism that corrects the angle and eccentricity of the master 100 during rotation may also be provided separately. For example, an eccentric tilt mechanism may be provided in a chucking mechanism.

In this way, in the transfer device 300, the circumferential shape of the master 100 is transferred to the transfer film 3a while transporting the transfer film 3a roll-to-roll. With this arrangement, the optical body 1 is produced.

In the case where the optical body 1 is produced with a thermoplastic resin, the applicator device 307 and the light source 309 are unnecessary. Further, the base material 10 is formed as a thermoplastic resin film, and a heating device is placed more on the upstream side than the master 100. The base material 10 is heated by the heating device and is softened; after that, the base material 10 is pressed against the master 100. Thereby, the master concave-convex structure 120 formed on the circumferential surface of the master 100 is transferred to the base material 10. The base material 10 may be also a film formed of a resin other than thermoplastic resins, and the base material 10 and a thermoplastic resin film may be laminated together. In this case, the laminate film is heated by the heating device, and is then pressed against the master 100. Therefore, the transfer device 300 can continuously produce a transfer body to which the master concave-convex structure 120 formed on the master 100 has been transferred, that is, the optical body 1.

In addition, a transfer film to which the master concave-convex structure 120 of the master 100 has been transferred may be produced, and the transfer film may be used as a transfer mold to produce the optical body 10. Also, the master 100 may be duplicated by electroforming, thermal transfer, or the like, and the duplicate may be used as a transfer mold. Furthermore, the shape of the master 100 is not necessarily limited to a roll shape, and may also be a planar master. Besides a method of irradiating resist with the laser light 200A, various processing methods can be selected, such as semiconductor exposure using a mask, electron beam lithography, machining, or anodic oxidation. Further, a resin film on which either or both of the first concave-convex structure 11 and the second concave-convex structure 12 are formed by the manufacturing method described above may be stuck to each of both surfaces of the base material 10. Further, structures in which the respective concavities and convexities are inverted may be used as the first concave-convex structure 11 and the second concave-convex structure 12 described above.

EXAMPLES

1. Example 1

(1-1. Production of Optical Body)

In Example 1, the optical body 1 was produced by the following steps. First, an acrylic resin plate with a thickness of 2 mm (Acrylite, manufactured by Mitsubishi Rayon Co., Ltd.) was prepared as the base material 10. Next, using the transfer device 300 shown in FIG. 9, the first concave-convex structure 11 and the second concave-convex structure 12 were formed on one surface of a triacetyl cellulose film with a thickness of 60 μm. Here, an ultraviolet-curing acrylic resin composition manufactured by Toagosei Co., Ltd. was used as a light-curing resin composition. The first concave-convex structure 11 was formed in a randomly distributed arrangement in which each of the track pitch P1 and the dot pitch P2 was in the range of 400 nm to 1.5 μm. Thus, the average period of concavity and convexity of the first concave-convex structure 11 is made more than or equal to the minimum value of the visible light wavelength band and less than or equal to 10 μm. The average height of the first concave-convex structure 11 was set to 350 nm. The concave-convex arrangement of the second concave-convex structure 12 was set to a zigzag arrangement in which the dot pitch P11 was 230 nm and the track pitch was 153 nm. Thus, the average period of concavity and convexity of the second concave-convex structure 12 is made less than the minimum value of the visible light wavelength band. The average height of the second concave-convex structure 12 was set to 250 nm.

Further, a thermoplastic resin film on which only the second concave-convex structure 12 was formed was produced by a similar method. The shape of the second concave-convex structure 12 was set similarly to the above. Then, an adhesive film (a PDS1 film manufactured by Panac) was stuck to each of both surfaces of the base material 10. Next, the resin films mentioned above were stuck individually onto the adhesive films; thereby, the optical body 1 according to Example 1 was produced. This optical body 1 corresponds to the optical body 1a shown in FIG. 1. The surface structure of the first concave-convex structure 11 is shown in FIG. 10, and the surface structure of the second concave-convex structure 12 is shown in FIG. 13.

(1-2. Evaluation of characteristics)

(1-2-1. Specular reflection spectrum)

Figure 14:
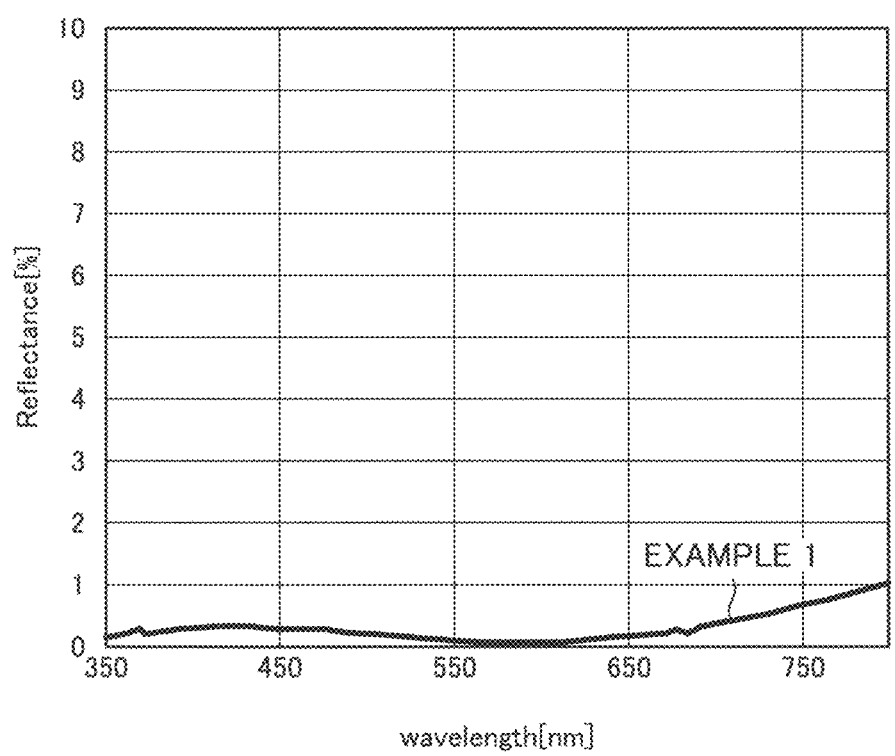
FIG. 14 is a graph showing a spectral specular reflection spectrum of Example 1.

Next, characteristics of the optical body 1 according to Example 1 were evaluated. First, a spectral specular reflection spectrum of the optical body 1 was measured. The measurement of the specular reflection spectrum evaluates reflection characteristics in the second concave-convex structure 12 of the optical body 1. The spectral specular reflection spectrum was measured using a spectrophotometer (type: V-550, equipped with an absolute reflectance measuring unit, manufactured by Jasco Corporation). Each of the angle of incidence and the angle of reflection was set to 5°, the wavelength range was set to 350 to 800 nm, and the wavelength resolution was set to 1 nm. Measuring light was applied to the other surface 10B of the base material 10 (the surface on which only the second concave-convex structure 12 was formed). The result is shown in FIG. 14. The horizontal axis of FIG. 14 represents the measuring wavelength (nm), and the vertical axis represents the specular reflectance (%). As a result, it has been found that the specular reflectance is suppressed to less than or equal to approximately 1%.

(1-2-2. Measurement of Luminance and Xy Values)

Next, the luminance and the xy values (the xy values in Yxy color coordinates) when the optical body 1 was caused to emit light were measured. The measurement was performed by the following steps. The measurement was performed in a dark environment. First, an LED light source (LPAC1-2430NCW-R4, manufactured by Aitec System Co., Ltd.) was placed in an end portion in the row direction of the optical body 1. Further, a luminance meter (CS1000, manufactured by Konica Minolta, Inc.) was placed on the one surface 10A side. The placement position was set to a position 50 cm apart from the one surface 10A, and the optical axis of the luminance meter was set perpendicular to the one surface 10A. Next, high-luminance white light was injected into the optical body 1 from the LED light source, and the luminance ($cd/cm^2$) and the xy values were measured with the luminance meter. Further, the luminous color of the optical body 1 was observed by visual inspection. The results are shown in Table 1.

2. Examples 2 and 3

Similar tests to Example 1 were performed except that each of the dot pitch P1 and the track pitch P2 of the first concave-convex structure 11 was randomly varied in the ranges shown in Table 1 (that is, the concave-convex arrangement was set to random arrangements). The results are shown collectively in Table 1. The surface structure of the first concave-convex structure 11 of Example 2 is shown in FIG. 11, and the surface structure of the first concave-convex structure 11 of Example 3 is shown in FIG. 12.

3. Comparative Example 1

A similar test to Example 1 was performed except that the first concave-convex structure 11 was not formed. The results are shown collectively in Table 1.

4. Example 4

A similar test to Example 1 was performed except that each of the dot pitch P1 and the track pitch P2 of the first concave-convex structure 11 was varied in a sine wave sweeping manner in the range of 500 to 2000 nm. The results are shown collectively in Table 2.

5. Examples 5 to 8

Similar tests to Example 1 were performed except that the concave-convex arrangement of the first concave-convex structure 11 was set to zigzag arrangements having the average periods shown in Table 2. The results are shown collectively in Table 2. In Table 2, also the results of Comparative Example 1 are shown for comparison.

6. Examples 9 to 13

In Examples 9 to 13, similar tests to Example 1 were performed except that the concave-convex arrangement of the first concave-convex structure 11 was set to a zigzag arrangement having an average period of 1 μm and that the average height was set to the values shown in Table 3. The results are shown in Table 3. Here, the wavelength of light emitted from the light source was set to 550 nm. As the diffraction efficiency, the value obtained by dividing the intensity measured with the luminance meter by the intensity of light emitted from the light source was used.

7. Consideration

From Examples 1 to 3, it has been revealed that, in the case where the pitch of the first concave-convex structure 11 was set in a random way and white light was emitted from the light source, white light can be extracted with good efficiency. Further, from Example 1, it has been revealed that the reflection of extraneous light can be suppressed by the second concave-convex structure 12. Further, from Examples 4 to 8, it has been revealed that, in the case where the pitch of the first concave-convex structure 11 has periodicity and white light is emitted from the light source, light of a color in accordance with the average period of the first concave-convex structure 11 can be extracted. Further, from Examples 9 to 13, it has been revealed that, in the case where the average height of the first concave-convex structure 11 is more than or equal to 100 nm, light can be extracted with better efficiency.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

TABLE 1

| | Concave-convex pitch and arrangement | Luminance (cd/m$^2$) | Color coordinate x | Color coordinate y | Color |
|---|---|---|---|---|---|
| Example 1 | 400 nm to 1.5 μm, random | 620 | 0.29 | 0.27 | white |
| Example 2 | 600 nm to 5.0 μm, random | 380 | 0.29 | 0.29 | white |
| Example 3 | 1.0 μm to 10 μm, random | 63 | 0.29 | 0.28 | white |
| Comparative Example 1 | 230 nm/153 nm, zigzag arrangement | 6.2 | 0.28 | 0.27 | white |

TABLE 2

| | Concave-convex pitch and arrangement | Luminance (cd/m$^2$) | Color coordinate x | Color coordinate y | Color |
|---|---|---|---|---|---|
| Example 4 | 500 to 2000 nm, sine wave sweeping | 260 | 0.32 | 0.27 | white |
| Example 5 | 370 nm, zigzag arrangement | 80 | 0.11 | 0.10 | blue |
| Example 6 | 400 nm, zigzag arrangement | 240 | 0.14 | 0.41 | green |
| Example 7 | 500 nm, zigzag arrangement | 480 | 0.39 | 0.43 | yellow |
| Example 8 | 600 nm, zigzag arrangement | 620 | 0.49 | 0.32 | red |
| Comparative Example 1 | 230 nm/153 nm, zigzag arrangement | 6.2 | 0.28 | 0.27 | white |

TABLE 3

| | Example 9 | Example 10 | Example 11 | Example 12 | Example 13 |
|---|---|---|---|---|---|
| Average height (nm) | 50 | 100 | 150 | 300 | 500 |
| Diffraction efficiency (%) | 0.8 | 2.8 | 5.6 | 14 | 18.3 |

REFERENCE SIGNS LIST 1a, 1b optical body
10 base material
11 first concave-convex structure
11a light extraction convexity
11b light extraction concavity
12 second concave-convex structure
12a diffraction suppression convexity
12b diffraction suppression concavity
20 light source

The invention claimed is:

1. An optical body comprising:
   a base material;
   a first concave-convex structure that is formed on at least one surface of the base material and that extracts internally propagating light that is injected into an inside of the base material from a side surface of the base material, and
   a second concave-convex structure that is formed on the at least one surface of the base material where the first concave-convex structure is formed in a region where the first concave-convex structure is not formed and wherein an average period of concavity and convexity of the second concave-convex structure is less than the minimum value of the visible light wavelength band,
   wherein an average period of concavity and convexity of the first concave-convex structure is more than or equal to a minimum value of a visible light wavelength band and less than or equal to 10 μm, and
   wherein the first concave-convex structure has a height of from 100 to 500 nm and the second concave-convex structure has a height of more than or equal to 150 nm.

2. The optical body according to claim 1,
   wherein an average height of convex portions of the second concave-convex structure is more than or equal to 150 nm.

3. The optical body according to claim 1,
   wherein a pitch of concavity and convexity included in the first concave-convex structure is in a random way.

4. The optical body according to claim 1,
   wherein a pitch of concavity and convexity included in the first concave-convex structure has periodicity.

5. A master on a surface of which an inverse shape of the optical body according to claim 1 is formed.

6. A method for manufacturing an optical body comprising:
   a step of producing a master on a surface of which an inverse shape of the optical body according to claim 1 is formed; and
   a step of transferring a surface shape of the master onto a base material.

7. A light emitting device comprising:
   the optical body according to claim 1; and
   a light source that is provided on a side surface of the optical body and injects light into an inside of the optical body from the side surface of the optical body.

8. The optical body according to claim 1, wherein the second concave-convex structure has a height of from 150 nm to 250 nm.

9. An optical body comprising:
   a base material;
   a first concave-convex structure that is formed on at least one surface of the base material and that extracts internally propagating light that is injected into an inside of the base material from a side surface of the base material, and
   a second concave-convex structure that is formed on the at least one surface of the base material where the first concave-convex structure is formed in a region where the first concave-convex structure is not formed and wherein an average period of concavity and convexity of the second concave-convex structure is less than the minimum value of the visible light wavelength band,
   wherein an average period of concavity and convexity of the first concave-convex structure is more than or equal to a minimum value of a visible light wavelength band and less than or equal to 10 μm, and
   wherein the first concave-convex structure is a structure in which concavities and convexities are arranged scatteredly in a matrix configuration.

* * * * *